(12) United States Patent
Vogel et al.

(10) Patent No.: US 6,514,448 B1
(45) Date of Patent: Feb. 4, 2003

(54) DEVICE FOR TEMPERING PREFORMS AND TEMPERING METHOD

(76) Inventors: Klaus Vogel, Rueterberg 4 a, D-22885 Barsbüttel (DE); Hartwig Müller, Heierkoppel 14, D-22952 Lütjensee (DE); Julian Choinski, Conventstrasse 7, D-22089 Hamburg (DE); Andreas Klages, Pfarrstrasse 11, D-22149 Hamburg (DE); Marko Moritz, Friedrich-Ebert-Damm 52, D-22047 Hamburg (DE)

( * ) Notice: Subject to any disclaimer, the term of this patent is extended or adjusted under 35 U.S.C. 154(b) by 0 days.

(21) Appl. No.: 09/582,368

(22) PCT Filed: Dec. 14, 1998

(86) PCT No.: PCT/DE98/03694

§ 371 (c)(1),
(2), (4) Date: Jun. 22, 2000

(87) PCT Pub. No.: WO99/33635

PCT Pub. Date: Jul. 8, 1999

(30) Foreign Application Priority Data

Dec. 24, 1997 (DE) .......................................... 197 57 818

(51) Int. Cl.⁷ ............................................... B29C 49/68
(52) U.S. Cl. ....................... 264/346; 264/521; 425/526; 425/534; 425/445; 432/10; 432/11; 432/124
(58) Field of Search ................................ 264/458, 521, 264/346; 425/174.4, 526, 534, 445; 432/10, 11, 124

(56) References Cited

U.S. PATENT DOCUMENTS

| | | | |
|---|---|---|---|
| 3,632,713 A | 1/1972 | Seefluth | |
| 3,775,524 A | 11/1973 | Seefluth | |
| 3,892,830 A | 7/1975 | Hudson et al. | |
| 3,950,459 A | 4/1976 | Seefluth | |
| 4,035,463 A | * 7/1977 | Rosenkranz et al. | ......... 264/521 |
| 4,207,063 A | * 6/1980 | Sugita et al. | .................. 432/11 |
| 4,233,010 A | * 11/1980 | Suzuki | ........................ 425/526 |
| 4,362,498 A | * 12/1982 | Harry et al. | ................. 425/526 |
| 4,929,450 A | 5/1990 | Takakusaki et al. | ......... 425/526 |
| 5,292,243 A | 3/1994 | Gibbemeyer | ................. 425/526 |
| 5,681,521 A | * 10/1997 | Emmer et al. | .............. 264/521 |
| 5,853,775 A | * 12/1998 | Oas et al. | .................... 264/521 |

FOREIGN PATENT DOCUMENTS

| | | |
|---|---|---|
| DE | 25 59 094 | 7/1976 |
| DE | 25 13 834 B2 | 5/1979 |
| DE | 33 14 106 A1 | 10/1984 |
| DE | 38 12 757 A1 | 10/1989 |
| DE | G 90 06 376.7 U1 | 6/1991 |
| DE | 689 05 172 T2 | 7/1993 |
| DE | 196 08 570 A1 | 9/1997 |
| EP | 0 059 016 | 9/1982 |
| EP | 0 620 099 A1 | 10/1994 |
| WO | WO 97/32713 | 9/1997 |

* cited by examiner

*Primary Examiner*—Robert Davis
(74) *Attorney, Agent, or Firm*—Harness, Dickey & Pierce PLC

(57) ABSTRACT

The process is used for tempering preforms made of a thermoplastic material; the preforms are to be blow molded. The preforms are provided with a temperature profile along a circumference. The temperature profile is generated by differentially heating strip-shaped regions, which extend in the direction of a longitudinal axis of the preform. A step-by-step tempering for the purpose of temporally sequential thermal conditioning of different regions of the preform is carried out with movement phases and rest phases. A carrier device is rotated by the interactions of a gear and a matching gear for initiating rotational movements. The preform is moved, motionless with regard to the rotational direction, through the tempering zone at least along a portion of the transport path before the start of the engagement of the gear with the matching gear.

24 Claims, 7 Drawing Sheets

DEVICE FOR TEMPERING PREFORMS AND TEMPERING METHOD

BACKGROUND AND SUMMARY OF THE INVENTION

The invention concerns a process for tempering preforms made of a thermoplastic material, where the preforms are intended to be blow-molded into containers and where the preform is provided with a temperature profile along a circumference, which is generated by differentially heating strip-shaped portions, which extend in the direction of a longitudinal axis of the preform, and where step-by-step tempering for the purpose of sequential thermal conditioning of different regions of the preform is implemented, and where step-by-step rotation with a motion phase and a rest phase is carried out as well.

The invention further concerns a device for tempering preforms made of a thermoplastic material, which includes at least one transport path for the preforms and at least one heating device, and which provides the preforms with a temperature profile in the circumferential direction and with at least one rotational drive unit for carrying out a rotational movement of the preform, which generates a step-by-step rotational motion of the preforms.

Such a process is used, for example, when containers are to be produced whose cross-sections deviate from a circular shape. The deviation can, for example, consists of producing containers with an oval cross-section or, for example, with a triangular or a rectangular cross-section.

The production of such non-rounded containers was already described in U.S. Pat. No. 3,775,524. At first, a symmetrical tempering of the preforms occurs, then the temperature in selected regions is selectively increased. Further variants of temperature profiling of the preform in a circumferential direction are also described in U.S. Pat. No. 3,632,713, U.S. Pat. No. 3,950,459 as well as in U.S. Pat. No. 3,892,830. A temperature conditioning process by selective shading is presented in DE-OS 33 14 106.

From U.S. Pat. No. 5,292,243 it is known to simultaneously subject two preforms to temperature conditioning in the circumferential direction. In EP-OS 0 620 099 a compilation of processes for temperature conditioning known from the state of the art can be found. A step-by-step rotary motion of the preforms during temperature conditioning is explained in PCT-WO 97 32 713.

The previously known individual processes have a number of disadvantages, for example, a relatively high apparatus cost is incurred, only a relatively poor reproducibility can be ensured, or, according to the device of the last-mentioned publication, the production volume per unit time is limited.

It is, therefore, the objective of the present invention to present a process of the kind mentioned in the introduction in such a manner that a high-quality temperature conditioning process can be achieved at a high rate of production.

This objective is achieved according to the invention in that the preform is transported by a carrier device through a tempering zone, that the carrier device is given a rotary motion by engaging a gear for the initiation of rotary motion, which engages a matching gear and that the preform is moved at least along a portion of the transport path before the gear engages the matching gear, and is moved at least along a further portion of the transport path through the tempering zone after the interaction between the gear teeth has stopped without motion relative to the rotational direction It is a further objective of the present invention to design a device of the previously mentioned type in such a manner that a selective tempering of the preform can be achieved at a high rate of reproducibility and a high rate of production.

This objective is achieved according to the invention in that a carrier device for the preforms includes a control element, which is disposed eccentrically relative to a longitudinal axis of the carrier device, which can be positioned by a radial cam and which provides positioning of the preform in the direction of rotation, and that the radial cam has at least two cam segments along the transport path, which are parallel to the transport path, as well as at least two cam segments, which are transverse to the transport path.

The step-by-step tempering of a preform makes it possible, for example, to dispose common radiant heaters according to the state of the art along with IR-radiators along a transport path of the preform and to expose different regions of the preform to the radiation for different periods of time. In this case in particular no costly coordination between the velocity of a longitudinal movement in the transport direction and the speed of rotation is required.

The arrangement of the preform on a carrier device during the heating process makes it possible to allow the forces for carrying out the positional changes and for generating the transport velocity to only indirectly affect the preform. The preform can be disposed at leisure relative to the carrier device, and all movements are generated by the interaction of functional elements with the carrier device. This facilitates a protective handling of the preform, which has been plasticized by the tempering process. By generating the rotary motion in accordance with the process according to the invention by means of the interaction of a gear with a matching gear, a very high flexibility in the setting of the motion sequences is achieved. Moving the preform through sequential phases of a gear engagement and the translational phases of the preform without rotary movements supports the generation of the required temperature profile in the circumferential direction.

The radial cam contemplated according to the device of the invention for positioning the carrier device, facilitates the implementation of position changes of the preform in the direction of rotation without any active actuating elements, but merely by tracking the radial cam during the implementation of the forward motion of the preform. The use of radial cams and associated control elements at the carrier device leads to an exact reproducibility of the rotational positioning actions and avoids deviations from the required positioning which increase along the transport path.

In order to support a space-saving process implementation it is proposed that the preform be transported along a curved heating path.

A simple transport process in the region of the heating device can be achieved by having the preform transported in the region of the heating device by a heating wheel.

For providing a thermal basic conditioning it is proposed that the preform, in an initial region of the heating path, be at first continuously rotated for providing it with a basic tempering.

A further possibility for carrying out a part of the rotary movement consists in positioning the carrier device in a guide rail in the rotational direction by the action of a control element.

An effective initiation of positioning forces can be accomplished by introducing lever-like positioning forces by means of the control element into the carrier device.

A mechanical establishment of a given rotational positioning is supported in that the carrier device, along at least a portion of the transport path, is moved by means of a transversely forwardly oriented lever-like control element.

It also proves to be advantageous that the carrier device is moved along at least a portion of the transport path by means of a transversely rearwardly oriented lever-like control element.

To facilitate a tempering of the wall regions, which are relatively uniform with respect to each other, it is proposed that when the gear teeth engages the matching gear, as well as during an interaction between the control element and the guide rail, a common rotational direction of the carrier device be maintained.

However, alternatively it is also possible that the carrier device, when the gear engages the matching gear, be rotated in the opposite direction to that of an interaction between the control element and the guide rail.

The rotational positioning actions can be achieved at a low degree of friction by providing the control element with a cam roller.

In order to facilitate a modular implementation of the heating device it is proposed that the heating device include heating boxes, which are equipped with infrared radiators.

A spatially effective arrangement of the individual components consists in placing the matching gear between two heating boxes.

In order to achieve an optimum utilization of the available space it is proposed that the heating boxes be placed relative to the transport path of the preforms at the outside along the heating wheel.

An advantageous realization of the carrier device consists in designing the carrier device as a transport rod, which includes a holding device for the preforms.

In order to provide rotational positioning of the preforms as well as of the blow-molded bottles, which is always spatially exact, it is proposed that at least along a portion of the transport path of the preforms outside the region of the heating devices, a radial cam for the control elements be provided.

A further variant for handling the preforms consists in providing radial cams for the control elements, except for the transport path of the preforms through the blow-molding device as well as in the region of a uniform rotation of the preforms along the heating device and along other regions of the transport path of the preforms through the device for blow-molding.

BRIEF DESCRIPTION OF THE DRAWINGS

In the drawing, examples of embodiments of the invention are shown schematically. The figures show the following.

DESCRIPTION OF THE PREFERRED EMBODIMENTS

Figure 1:
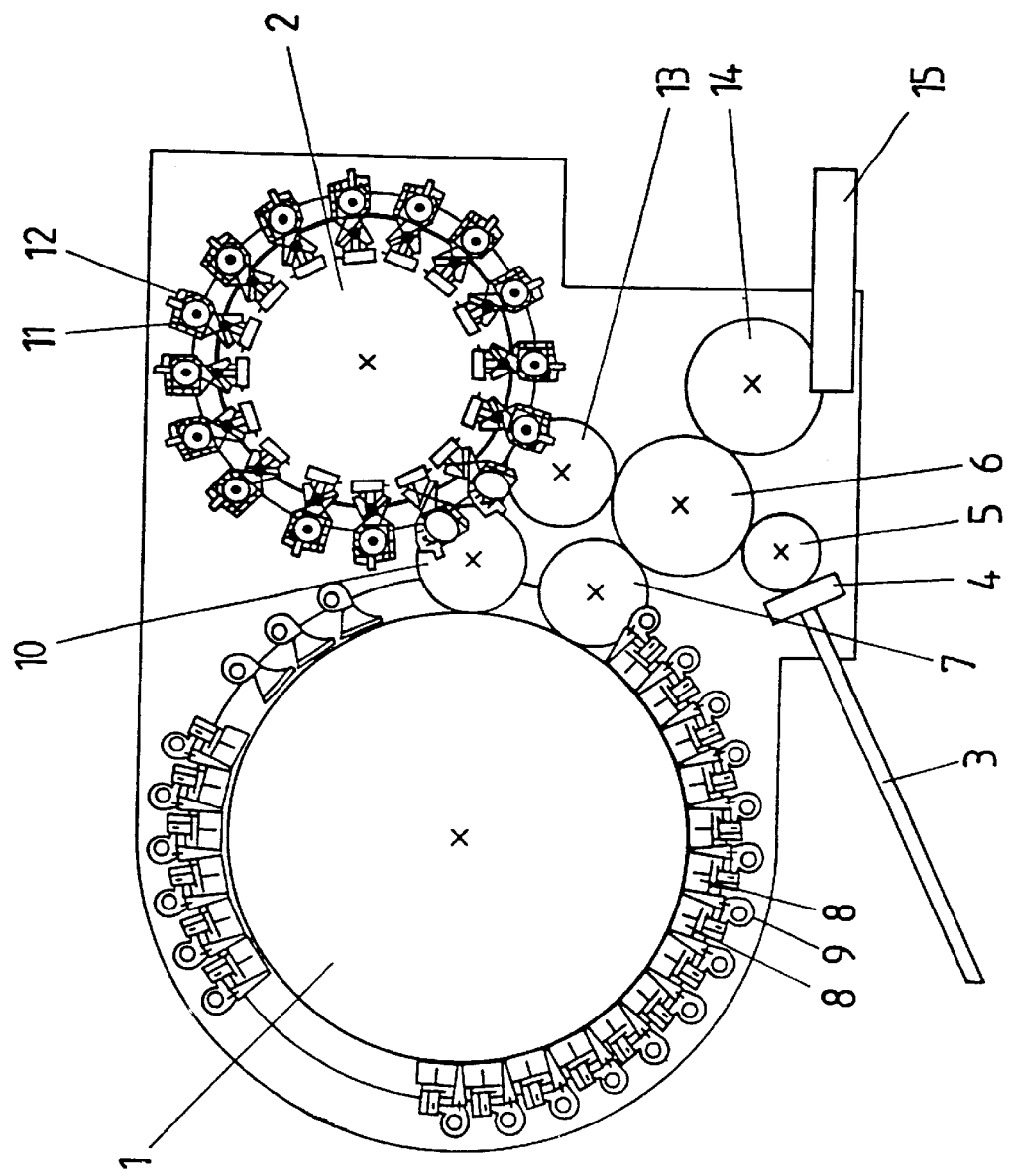
FIG. 1 is a simplified presentation of a device for blow-molding with heating wheel and blow-molding wheel, in accordance with the present invention.

In the case of the embodiment shown in FIG. 1, the device for blow-molding containers includes a heating wheel (1) and a blow-molding wheel (2). The preforms to be processed are guided via a supply rail (3) into the region of a turning device (4) and transported by the transfer wheels (5, 6, 7) into the region of the heating wheel (1). In this variant, the preforms are guided along the supply rail (3) hanging with their openings pointing upwardly, and they are turned by the turning device (4) by 180°. Heating in the region of the heating wheel (1) thus occurs in such a manner that the preforms are standing with their openings oriented downwardly. But it is also conceivable to carry out heating in the hanging orientation without a preceding turning of the preforms.

Along the heating wheel (1) there are heating devices (8) and cooling devices (9). The heating devices (8) heat the preforms with the aid of IR-radiation, and the cooling devices (9) blow air upon the surfaces of the heated preform in order to cool them.

After completion of the heating process and after passing through a cooling region, the tempered preforms are transported from a transfer wheel (10) to the blow-molding wheel (2) and are here placed in forms (11), which are held in place by the blow-molding stations (12). The blow-molding stations (12) can be opened and closed like books. After completion of the blow-molding process, the blow-molded containers are removed from the blow-molding station (12) and are moved to a release path (15) by transfer wheels (13, 6, 14). In the case of blow-molding the preforms in the region of the blow-molding wheel (2) with the openings oriented downwardly, it is in particular contemplated to place a further turning device between the blow-molding wheel (2) and the release path (15), so that the blow-molded containers can be transported, while hangingin an upright position, in the region of the release path (15).

The preform consists typically of an opening section, a support ring separating the opening section from the neck region, a shoulder region blending into a wall section as well as a bottom. The support ring extends across the opening section transversely to a longitudinal axis. In the area of the shoulder region the outer diameter of the preform widens starting with the neck region.

The opening section can, for example, be equipped with an outer thread, which makes it possible to add a screw closure to the finished container. But it is also possible to equip the opening with an outer lip in order to generate a surface of attack for a crown cork. Beyond this, a multiplicity of further configurations is conceivable in order to facilitate the addition of plug-type closures.

Figure 2:
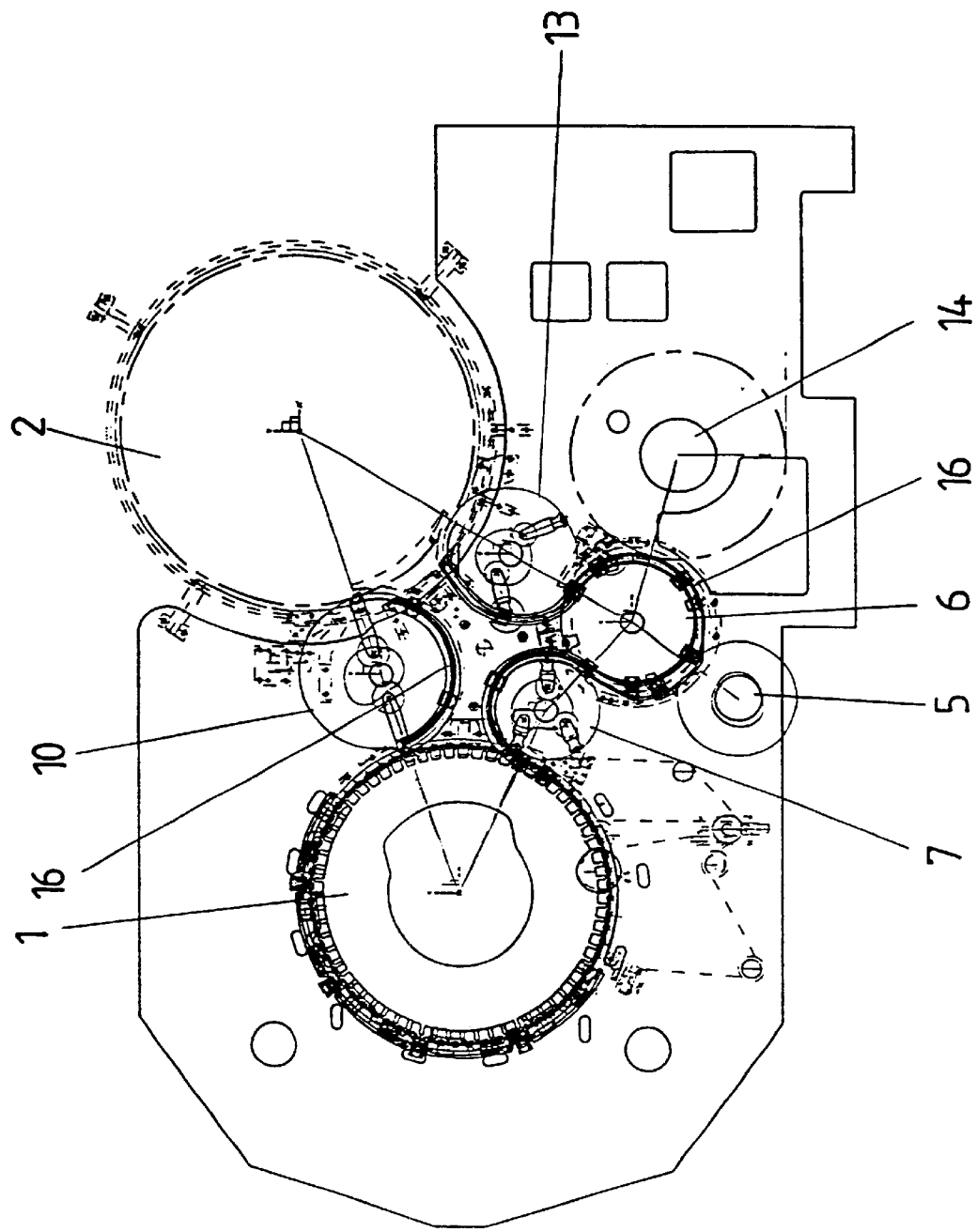
FIG. 2 is a presentation of a further device for blow-molding in another strongly schematized embodiment with rail-like guide elements for the carrier device along regions of the transport path also in accordance with the present invention.

From the presentation in FIG. 2 it can be seen that along the transport path of the preforms guide rails (16) are disposed, which provide the exactly defined orientations of the preforms in the direction of rotations in the region of the particular transport positioning. This can, in particular, ensure that the preforms, which have been provided with the temperature profile in the direction of the circumference in the region of the heating wheel (1) are transferred to the blow-molding stations (12) in the region of the blow-molding wheel (2) in a precisely known and established orientation. By this means a precisely defined allocation of the circumferential regions of the preforms to the contour of the forms (11) is achieved.

From FIG. 2 it is likewise recognizable that at least some of the transfer wheels (7, 10, 13) are equipped with transfer arms, which position the preforms or the blow-molded bottles.

Figure 3:
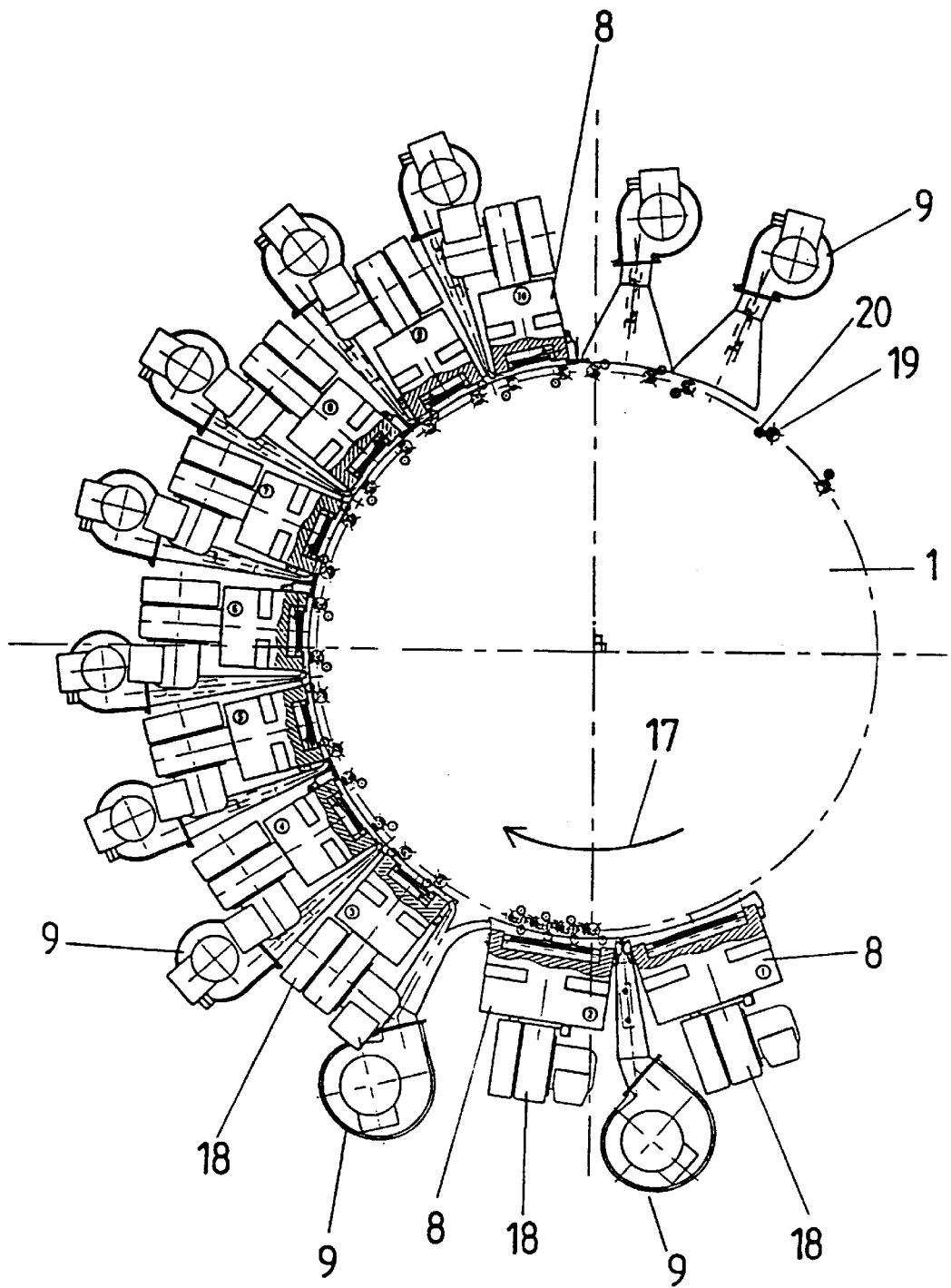
FIG. 3 a magnified presentation of a heating wheel of FIG. 4 with associated heating boxes and cooling blowers.

From the enlarged presentation of the heating wheel (1) in FIG. 3 it can be seen that in the direction of transport (17) at first two relatively wide heating devices (8) are arranged and that the subsequent heating devices (8) are smaller in the direction of transport. It is also recognizable that always between two heating devices (8) cooling devices (9) are located, which are constructed as blowers. Likewise one or more blowers (9) are provided in the direction of transport (17) behind the last heating devices (8). Along order to improve the life expectancy of the heating devices (8), the heating devices (8) themselves are equipped with blowers (18).

Figure 4:
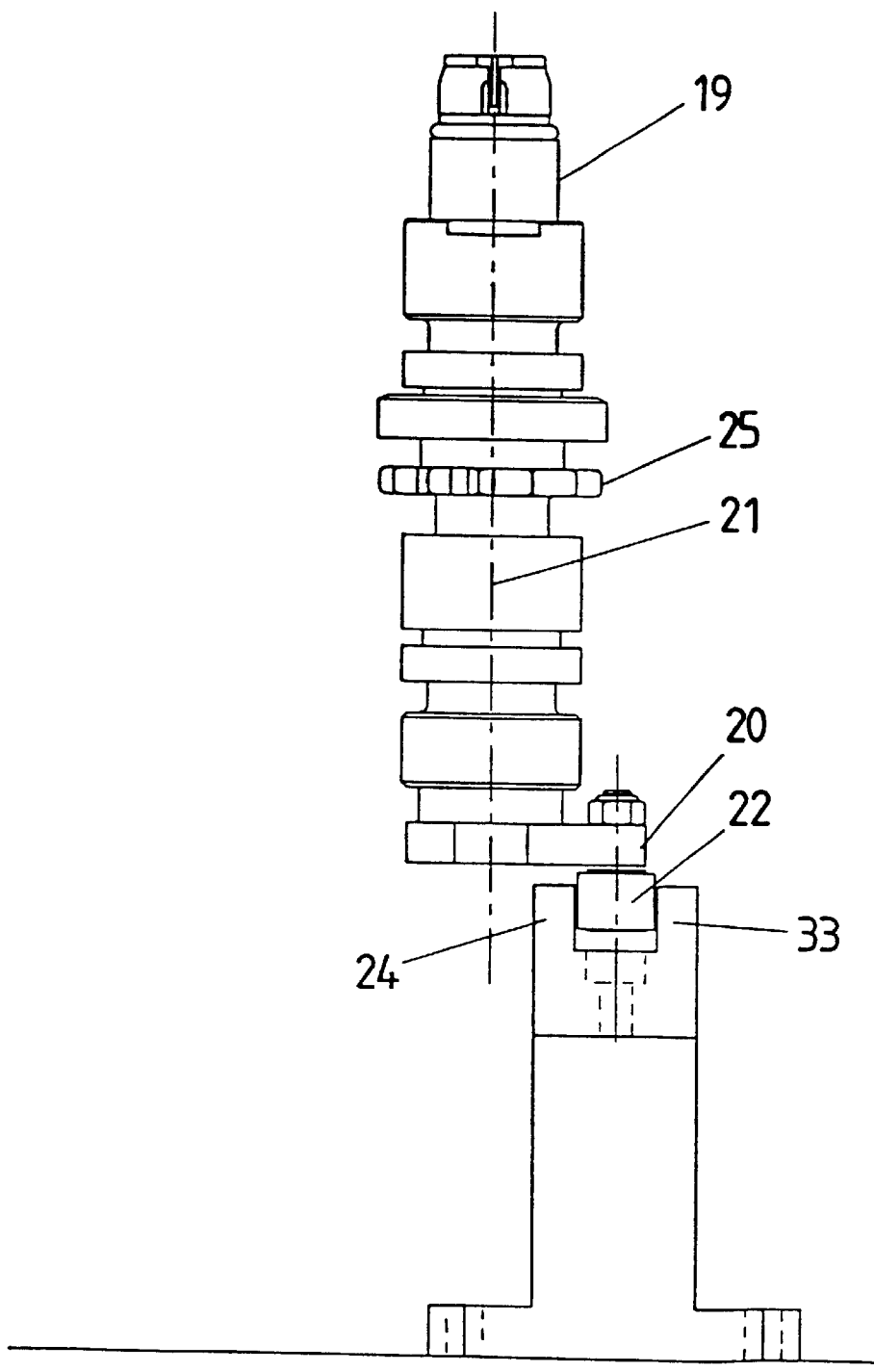
FIG. 4 is an enlarged a presentation of a carrier device for the preform shown in FIG. 3 with a control element and an associated radial cam.

The presentation in FIG. 4 illustrates an engagement of a carrier device (19) for the preforms, or, as the case may be, the blow-molded containers, with a control element (20) in the guide rail (16). The control element (20) is thus designed to include a cam roller (22), which is eccentric with respect to a longitudinal axis (21) of the carrier device (19). As a guide rail (16), for example, a U-shaped profile can be used, which guides the cam rollers (22) in the region of lateral legs (23, 24).

The carrier device (19) can be constructed as a transport rod, which feeds compressed air through an interior space to the preforms to be expanded in the region of blow-molding station (12).

According to the embodiment shown in FIG. 4 the carrier device (19) is provided with a gear (25), which can be constructed as a centrally located gear relative to the longitudinal axis (21). The gear is non-rotatably attached, to the carrier device (19).

From the presentation in FIG. 3 each positioning of the carrier device (19) with control element (20) in various orientations can be seen. Preferably, the eccentrically placed control element (20) is oriented after completing a rotary movement in the direction of transport (17), oriented either transversely forward of or transversely rearwardly of the direction of transport 17.

Figure 5:
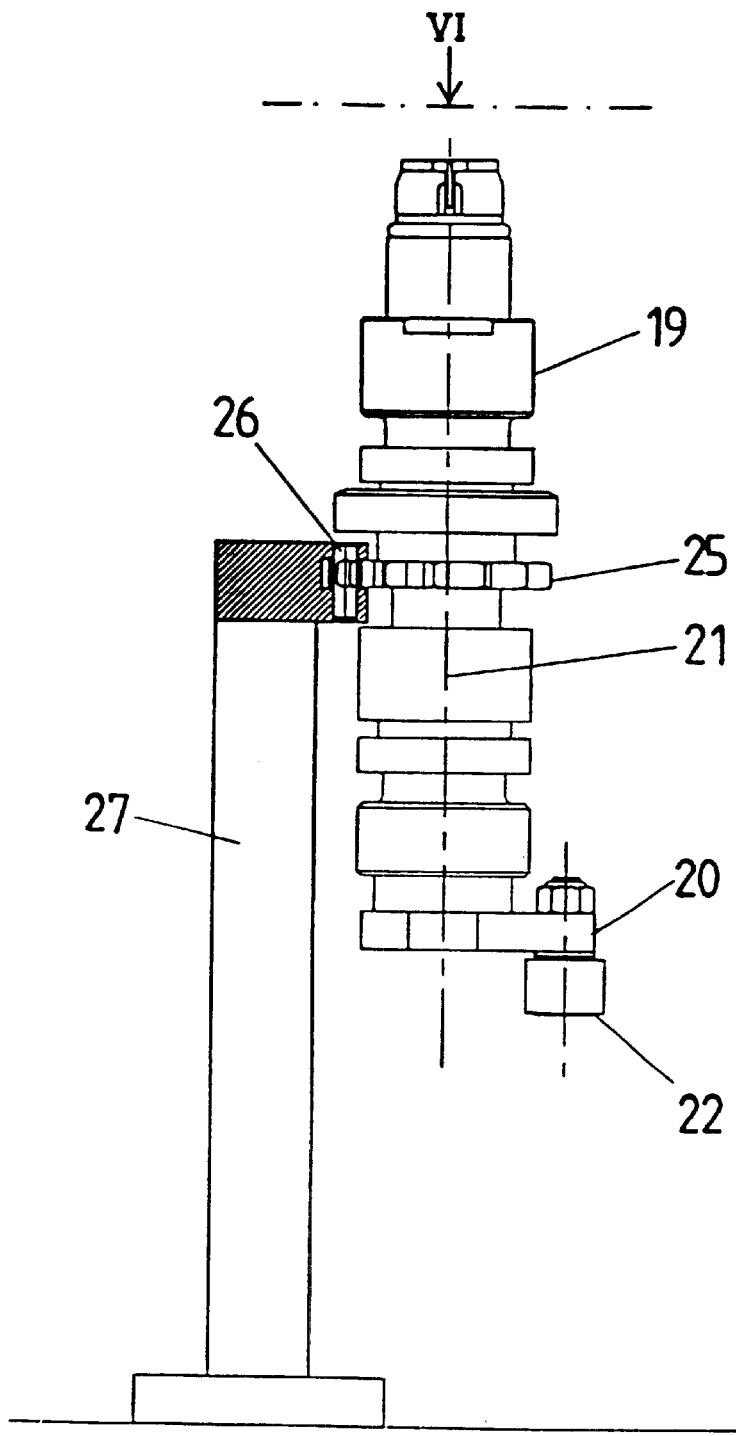
FIG. 5 is a presentation of the carrier device of FIG. 4 shown during the engagement of a gear of the carrier device with a matching gear, FIG. 6 a simplified presentation looking in the direction of arrow VI of the carrier of FIG. 5 as viewed.

FIG. 5 shows the carrier device (19) in a transport position, where the control element (20) is released from a guide rail (16). In this position, however, the gear (25) engages a matching gear (26), which is sup ported by of a support (27). In the embodiment shown, the matching gear (26) is attached as a rack segment or as a chain section to of the support (27). A rotary movement of the carrier device (19) is thus caused only by the translation of the carrier devices (19) in the direction of transport (17) and by the associated rolling motion of the gear (25) against the matching gear (26).

According to another embodiment, however, it has also been contemplated to make the matching gear (26) moveable. By means of this moveable arrangement of the matching gear (26), an active propulsion of the carrier device (19) in a circumferential direction can occur, in order to deliberately accelerate the rotational speed as opposed to a simple rolling action, or if need be, to slow it down as well.

Figure 6:
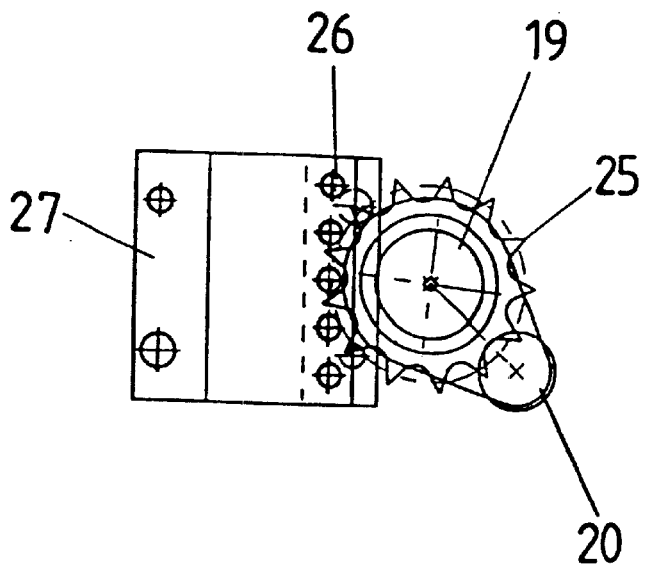

FIG. 6 shows a further possible embodiment of the matching gear (26). Here the elements for engaging the gear (25) are constructed as cylindrical segments and are given a distance from each other, which is adapted to the contouring of the gear (25).

Figure 7:
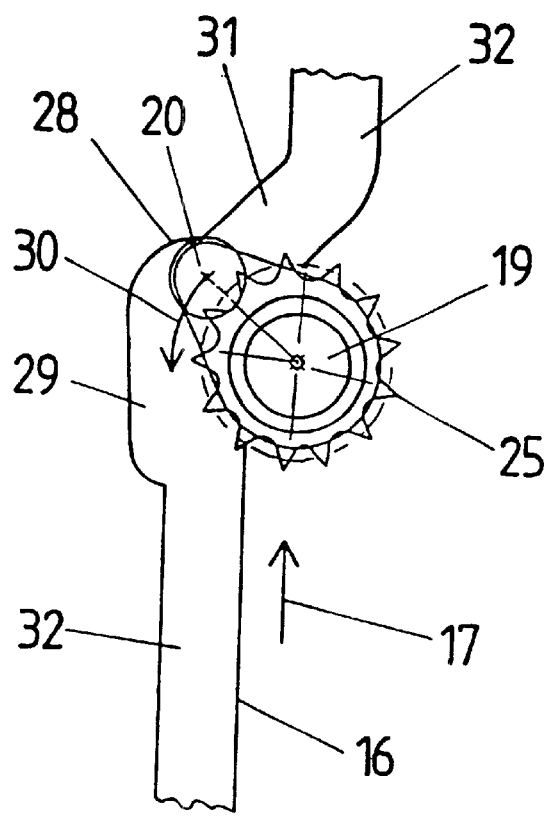
FIG. 7 is a further schematized presentation illustrating the interaction of a control element with the radial cam to effect a change in direction and FIG. 8 is a further presentation illustrating the shape of the radial cam along the transport path of the preform in the region of the heating device.

The detailed presentation in FIG. 7 illustrates the engagement of the control element (20) with the guide rail (16) in the region of a planned position change of the carrier device (19) in the circumferential direction. In the positioning of the transport device (19) shown, the control element (20) is oriented transversely forwardly of the transport direction (17) and bumps against a deflection flank (28) of the guide rail (16). Opposite to the direction of transport (17), the deflection flank (28) blends into a deflection depression (29), in the region of which one width of the guide rail (16) becomes greater relative the other widths of the guide rail (16). This enlargement makes it possible for the control element (20), following its contact with the deflection flank (28), to carry out a movement in the direction of the turn (30) during a further translational movement of the carrier device (19) in the transport direction (17).

The rotational movement of the carrier device (19) in the direction of the turn (30) is at first continued until such a time when the connecting line between the control element (20) and the longitudinal axis (21) is essentially directed transversely to the transport direction (17). When the translational movement of the carrier device (19) is continued in the transport direction (17), the control element (20) slides along a diagonal segment (31) of the guide rail (16) and thus results in a further turning of the carrier device (19) in the turning direction (30). This rotational movement will be continued until the control element (20) again enters the region of a segment (32), which extends essentially parallel to the transport direction (17). Then the position of the carrier device (19) shown in FIG. 6 will once again be assumed.

Figure 8:
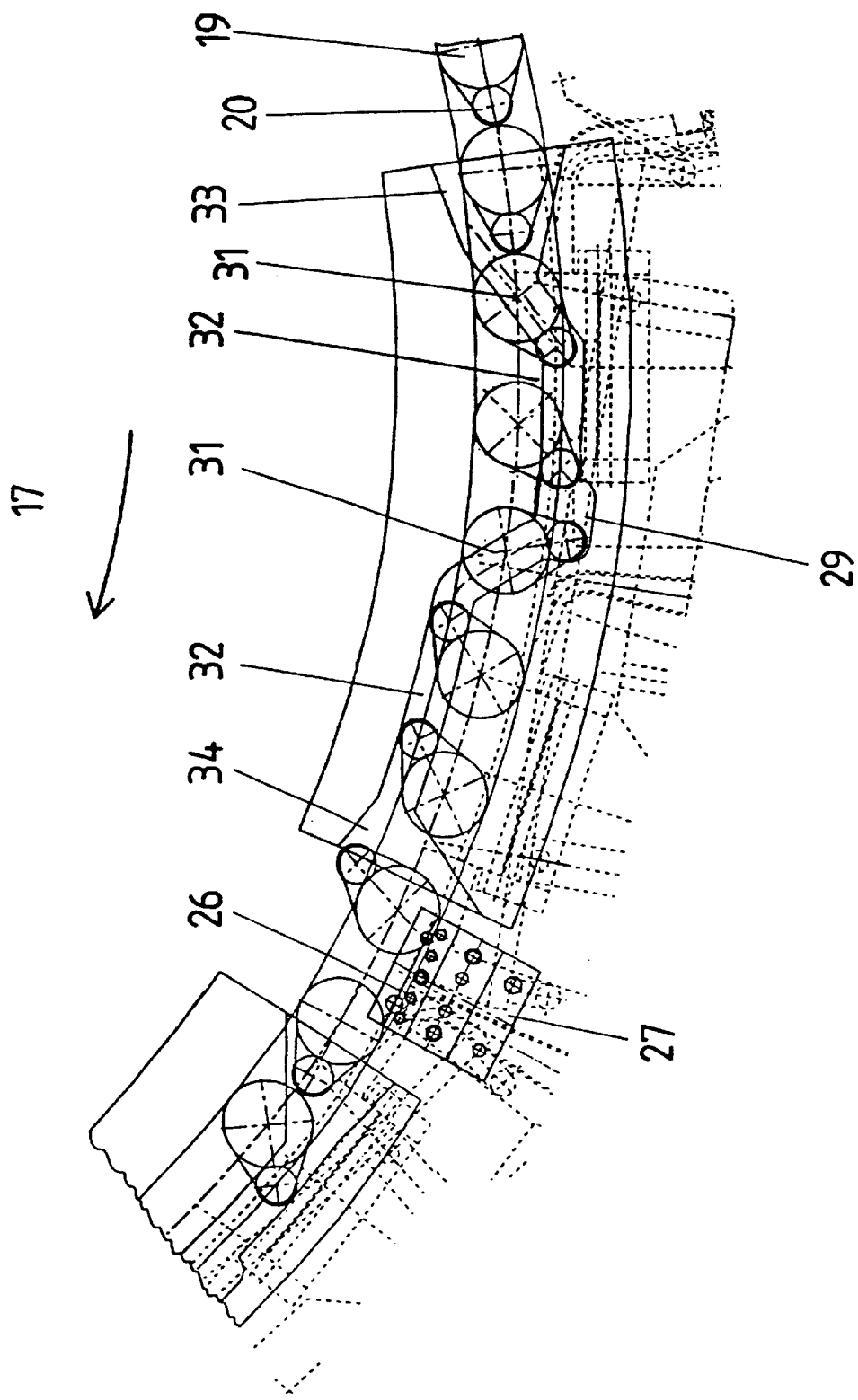

FIG. 8 illustrates a combination of segments of the guide rail (16) and the arrangement of matching gear (26). According to the embodiment shown, in the direction of transport (17) alternating segments of guide rails (16) and deflection depressions (29) are shown behind one another and between these segments matching gear (26) is disposed. In one orientation opposite to the direction of transport (17) a segment of the guide rail (16) begins always with an entry region (33), which becomes smaller, like a funnel, in the direction toward a first diagonal segment (31). By means of this funnel-like reduction of the entry region (33), any possible deviations of the orientation of a connecting line of the centers of the control element (20) and the carrier device (19) are compensated. By means of the diagonal segment (31), the control element (20) is oriented transversely forwardly in the transport direction (17).

In the turning depression (29) a reorientation occurs and a return to the starting position takes place after leaving the segment (16) in the region of the matching gear (26). In principle, it is possible to provide for a continuation in the region of the matching gear (26) of the rotational direction of the carrier device (19) as defined by the path of the guide rail (16), but it is equally possible to provide a rotational direction which is opposite to the original rotational direction, and by this means to cause a return to the original position. However, in principle, a continuous maintenance of the of the rotational orientation is preferred in view of the highest possible uniformity and reproducibility.

According to the embodiment shown in FIG. 8, the segment of the guide rail (16) also includes a disengagement region (34), which becomes larger in the transport direction (17). Due to this enlargement in the disengagement region (34), it is possible to provide for a spatially tight arrangement of the segments of guide rail (16) as well as of the matching gear (26), and in spite of a spatial superimposition of the control element (20) upon the disengagement region (34) to already cause a rotational movement of the carrier device (19).

For a further improvement of the technical effects, which have already been described in principle, different variations are conceivable. For example, for a secure fastening of the preform in the region of the carrier device (19) it is possible to provide a clamping ring disposed in the region of the carrier device (19). In order to carry out the required movements it is also advantageous in the case of the arrangement shown in FIG. 3, not only to provide for a rolling off of the two first—in the transport direction (17)—heating devices (8) of the carrier devices (19) with their gear (25) at a stationary, matching gear, but to provide here as a matching gear, for example, a driven chain. As compared to a simple rolling off at a stationary matching gear, by this means, the rotational velocity can, for example, be doubled.

Alternatively to a permanent control of the rotational positioning of the carrier device (19) outside the region of the heating wheel by an interaction of the control elements (20) with the guide rail (16), it is also possible not to provide the rotational orientation, at least for a region, and to provide a defined determination of the rotational orientation of the carrier devices (19) only before a transfer to the blow-molding station (12) or before a transport of the carrier devices (19) along the heating devices (8) by means of suitable guide elements.

In order to implement the temperature profile in the direction of the circumference of the preform, it is, for example, possible to carry out a rotation of the preform (1) around the longitudinal axis (8) with a step-by-step movement in such a manner, that always short movement sections and rest sections follow one another. In the case of temperature profiling in the circumferential direction with four angular regions, the movement can occur in such a manner, that at first, within a predeterminable rest section, a predeterminable angular region of the preform is turned toward the heating device (8), and that at the end of the rest section within the movement section, a subsequent angular region is moved relatively rapidly past the heating device (8). At the end of the second movement section, the second angular region is now facing the heating device (8). The preform will thus be rotated by 180°. The duration of the movement sections is normally made much shorter than the duration of the rest section.

For example, it is also possible to initially temper the preform uniformly and to generate the temperature profile subsequently with the help of the movement of the temperature profile described. It is also possible to provide for a movement of the preform during its rotation in such a manner, that, starting with a cold preform, the temperature profile is achieved by the different phases of movement. At least in the case of a temperature profiling, which follows an initial tempering, the movement sections are temporally much shorter than the rest sections. The ratio of the durations can, for example, be 1:10.

The measures described for the generation of a temperature profile in the region of the preform in the direction of its longitudinal axis as well as in the circumferential direction can be arbitrarily combined, so that an adaptation to the various actual preform geometries can be achieved.

In principle, any thermoplastic materials can be processed according to the described process and with the help of the described device. In particular, it is possible, for example, to process preforms of polypropylene or polyethylene terephthalate.

In view of the diverse possibilities described for tempering the preform, where the preform is at first uniformly tempered in the region to be tempered and then given a superimposed temperature profiling, it should be added that this tempering process can also be applied in the circumferential direction of the preform as well as in the longitudinal direction of the preform or with both spatial orientations combined. The heat profiling in the longitudinal direction is, furthermore, chosen especially in such a manner, that a high and uniform orientation of the material is achieved, in order to be able to ensure a strong blow-molded container as well as a low material consumption.

As an alternative to the use of a heating wheel in the region of the heater (8), it is, for example, also possible to carry out a transport of the preforms with the help of a drive chain. The corresponding elements for positioning the carrier devices (19) are in this case disposed along the transport chain. The transport chain can, for example, be placed along a rectangular base structure and be turned at corner regions of this base structure by means of rollers or gears. An arrangement of the heating devices (8) in the case of using a transport chain is preferably along linear regions of the transport chain. In principle, however, it is also possible to move the transport chain along a curved path.

We claim:

1. A process for tempering preforms made of a thermoplastic material, where the preforms are intended to be blow-molded into containers and where the preform is provided with a temperature profile along a circumference, which is generated by differentially heating strip-shaped portions, which extend in the direction of a longitudinal axis of the preform, and where a step-by-step tempering for the purpose of temporally sequential thermal conditioning of different regions of the preform is implemented, and where step-by-step rotation with a motion phase and a rest phase is carried out as well, characterized in that the preform is transported by a carrier device (19) through a tempering zone, that the carrier device (19) is given a rotational movement by the engagement of gear (25) with matching gear (26) for initiating rotational movements, and that the preform is moved at least along a portion of a transport path prior to the engagement of gear (25) with matching gear (26) and at least along a further part of the transport path after the termination of the engagement of the gear (25) with the matching gear (26) and that it is moved through the tempering zone without movement with respect to the rotational direction.

2. A process according to claim 1, characterized in that the preform is transported along a curved heating path.

3. A process according to claim 2, characterized in that the preform in the region of the heating device (8) is transported by a heating wheel (1).

4. A process according to claim 1, characterized in that the preform, in an initial region of the heating path, at first continuously rotates in order to be subjected to a basic tempering process.

5. A process according to claim 1, characterized in that the carrier device (19) is positioned in the direction of rotation by the interaction of a control element (20) with a guide rail (16).

6. A process according to claim 5, characterized in that by the control element (20), in a lever-like manner, positioning forces in the direction of the carrier device (19) are initiated.

7. A process according to claim 1, characterized in that the carrier device (19) is moved along at least a portion of the transport path by means of a lever-like control element (20), which is oriented transversely forwardly.

8. A process according to claim 7, characterized in that the carrier device (19) is moved along at least a portion of the transport path by means of a lever-like control element (20), which is oriented transversely rearwardly.

9. A process according to claim 8, characterized in that during an engagement of gear (25) with matching gear (26) as well as during an engagement of the control element (20) with the guide rail (16) a common rotational direction of the carrier device (19) is maintained.

10. A process according to claim 8, characterized in that during an engagement of gear (25) with matching gear (26) the carrier device (19) is moved in the opposite direction as during an engagement of the control element (20) with the guide rail (16).

11. A device for tempering preforms made of a thermoplastic material, which includes at least one transport path for the preforms and at least one heating device which provides the preforms with a temperature profile along a circumference, and where at least one rotational drive unit is provided for carrying out the rotational movement, which produces a step-by-step rotational movement of the preforms, characterized in that a carrier device (19) for the preforms through a tempering zone, that the carrier device (19) has a control element (20), which is eccentrically positioned relative to a longitudinal axis (21) of the carrier device (20), which can be positioned by a radial cam, and which determines a positioning of the preform in the rotational direction and that the radial cam along the transport path of the preform contains at least two cam segments, which are parallel to the transport path as well as at least two cam segments which proceed transversely to the transport path.

12. A device according to claim 11, characterized in that the control element (20) includes a radial cam (22).

13. A device according to claim 11, characterized in that the heating device (8) has heating boxes, which are equipped with infrared radiators.

14. A device according to claim 11, characterized in that the carrier device (19) includes a gear (25).

15. A device according to claim 14, characterized in that in the region of the heating device (8) a matching gear (26) is provided which corresponds to gear (25).

16. A device according to claim 15, characterized in that the matching gear (26) is disposed between two heating boxes.

17. A device according to claim 11, characterized in that the heating device (8) includes a heating wheel (1) for transporting the preforms.

18. A device according to claim 17, characterized in that the heating boxes are placed on the outside along the heating wheel (1) relative to the transport path of the preforms.

19. A device according to claim 11, characterized in that the carrier device (19) is designed as a transport rod, which includes a retaining means for the preforms.

20. A device according to claim 11, characterized in that at least along a part of the transport path of the preforms outside the region of the heating device (8) a radial cam for the control elements (20) is provided.

21. A device according to claim 20, characterized in that with the exception of the transport path along the blow-molding wheel (2) as well as the region of a uniform rotation of the preforms along the heating device (8), along the other regions of the transport path of the preforms through the device for blow-moldings radial cams for the control elements (20) are provided.

22. A device according to claim 11, characterized in that in the region of the heating device (8) a transport chain for moving the carrier devices (19) is used.

23. A device according to claim 22, characterized in that the transport chain is extended linearly in at least some regions.

24. A device according to claim 22, characterized in that the transport chain envelopes an essentially rectangular base structure.

* * * * *